US012757022B2

(12) United States Patent

Li et al.

(10) Patent No.: US 12,757,022 B2
(45) Date of Patent: Oct. 6, 2026

(54) DETECTION AND PROTECTION MECHANISM FOR FAKE RELAY STATION IN TELECOMMUNICATION NETWORK

(71) Applicant: NATIONAL CHENG KUNG UNIVERSITY, Tainan City (TW)

(72) Inventors: Jung-Shian Li, Tainan City (TW); I-Hsien Liu, Tainan City (TW); Meng-Huan Lee, Kaohsiung City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 49 days.

(21) Appl. No.: 18/960,638

(22) Filed: Nov. 26, 2024

(65) Prior Publication Data

US 2025/0184738 A1 Jun. 5, 2025

(30) Foreign Application Priority Data

Nov. 30, 2023 (TW) ................................ 112146475

(51) Int. Cl.
*H04W 12/122* (2021.01)
*H04W 12/40* (2021.01)

(52) U.S. Cl.
CPC ......... *H04W 12/122* (2021.01); *H04W 12/40* (2021.01)

(58) Field of Classification Search
CPC ............................ H04W 12/122; H04W 12/40
See application file for complete search history.

(56) References Cited

U.S. PATENT DOCUMENTS 10,356,064 B1 * 7/2019 Howard .............. H04L 63/0428
11,070,981 B2 * 7/2021 Lee ....................... H04W 12/10
2019/0334929 A1 * 10/2019 Teshome ............ H04L 41/0659
2021/0204175 A1 * 7/2021 Rangaraju ........... H04W 12/037

FOREIGN PATENT DOCUMENTS

WO WO-2020105025 A1 * 5/2020 .......... H04W 72/042

* cited by examiner

*Primary Examiner* — Linglan Edwards
*Assistant Examiner* — Jacob Benedict Knackstedt
(74) *Attorney, Agent, or Firm* — RABIN & BERDO, P.C.

(57) ABSTRACT

A detection and protection system for fake relay stations in a telecommunication network comprises a core network, which comprises a threat detection device comprising a radio terminal and a processor; and a plurality of signal relay stations, wherein the radio terminal is communicated with the signal relay stations, the threat detection device performs a wireless signal scanning, and the processor identifies the signal relay stations according to a result of the wireless signal scanning and judges whether there are fake relay stations among the signal relay stations; wherein, the processor decodes the information in the result of the wireless signal scanning, compares the identification information of each signal relay station in the information with a white list, so as to identify whether the signal relay stations include fake relay stations which do not belong to the white list, wherein the white list contains the identification information of legitimate relay stations; and wherein in case that the fake relay stations are identified, the processor sends out an alarming message.

8 Claims, 5 Drawing Sheets

DETECTION AND PROTECTION MECHANISM FOR FAKE RELAY STATION IN TELECOMMUNICATION NETWORK

TECHNICAL FIELD

The present disclosure relates to a detection and protection technology for fake relay stations in a telecommunication network, which can be applied to fake relay stations (or fake relay nodes) in various wireless networks, in particular to a detection and protection mechanism for judging fake relay stations by comparison with a white list.

BACKGROUND

One of the common security problems in mobile networks is the existence of fake base stations. Fake base stations are becoming more and more common, which brings great risks to communication security. Malicious actors can use these deceptive devices to intercept sensitive information, eavesdrop and launch various types of attacks. For example, criminals use fake base stations to send phishing messages to victims in public areas, let mobile phone users click on phishing websites through short messages and steal information including credit card details, and use the stolen victim data to make unauthorized purchases, resulting in substantial losses for the victims.

To solve this problem, the patent No. TW 108135212 proposes a solution, in which a fake base station is judged by receiving an Observed Time Difference of Arrival (OTDOA) message for locating user equipment. Wherein, when the identification code of the serving base station is not in the identification code list included in the OTDOA message, it is judged that the user equipment is connected to a fake base station. The threat detection device calculates a first distance according to a measurement report message sent back by the user equipment, and calculates a second distance between the user equipment and the serving base station according to the OTDOA message. When the difference between the first distance and the second distance is greater than the critical value, it is judged that the user equipment is connected to the fake base station.

In another patent case, TW 1757827, a method and equipment are provided for processing non-integrity protected rejection messages in a non-public network. Receiving a rejection message from a network function in a stand-alone non-public network (SNPN), wherein the information in the rejection message indicates that a specific device is not allowed to access the stand-alone non-public network through subscription; and a specific device is added to a list of disabled stand-alone non-public networks associated with an access through which the specific device sends a request and then receives a rejection message.

In view of the shortcomings of the prior art, the present disclosure provides a technology for detecting and protecting fake relay stations in a telecommunication network. Compared with the traditional technology, the detection and protection of the present disclosure mainly aims at the contents of wireless signals, and can be applied to the Internet of Things (IoT) or other telecommunication networks. The processing method of this case is safer than the traditional technology. For example, in the patent case TW 1757827, a list of prohibited stand-alone non-public networks is adopted, in which when a new fake relay station is connected, it is not necessarily listed in this list. In this way, there must be many corresponding processing steps to deal with this uncertain situation, and the process is very complicated.

SUMMARY

In an aspect, a detection and protection system for fake relay stations in a telecommunication network provided by the present disclosure includes: a core network comprising a threat detection device, which comprises a radio terminal and a processor; and a plurality of signal relay stations, wherein the radio terminal is communicated with the signal relay stations, the threat detection device performs a wireless signal scanning, and the processor identifies the signal relay stations according to a result of the wireless signal scanning and judges whether there are fake relay stations among the signal relay stations; wherein, the processor decodes the information in the result of the wireless signal scanning, compares the identification information of each signal relay station in the information with a white list, so as to identify whether the signal relay stations include fake relay stations which do not belong to the white list, wherein the white list contains the identification information of legitimate relay stations; and wherein in case that the fake relay stations are identified, the processor sends out an alarming message.

In an embodiment, in a case that the telecommunication network is a mobile communication network, the signal relay stations are base stations and the fake relay stations are fake base stations; or when the telecommunication network is an Internet of Things, the signal relay stations are Internet of Things gateways and the fake relay stations are fake Internet of Things gateways.

In an embodiment, the telecommunication network is the mobile communication network, and the identification information comprises: a System information block (SIB), or a main information block (MIB).

In an embodiment, the telecommunication network is the Internet of Things (IoT), and the identification information comprises: an identification code of each Internet of Things gateway, a parameter value of each Internet of Things gateway, a sensing range of a sensor connected to the Internet of Things gateway, and an operable range of a communication protocol of each Internet of Things gateway at a Field level, an Automation level and a Management level.

In an embodiment, the identification information of the signal relay station is generated based on a physical unclonable function (PUF) of an internal component of the signal relay station; wherein the signal relay station generates current identification code according to the physical unclonable function, and generates an identification code tracking record of the current identification code relative to initial identification code; and wherein the signal relay station restores the initial identification code according to the identification code tracking record and the current identification code.

In an embodiment, when the fake relay station is identified, the threat detection device sends out the alarming message to stop the core network signal from connecting with the fake relay station.

In an embodiment, the detection and protection system for fake relay stations in a telecommunication network further includes a memory unit for storing the identification information of each fake relay station in a fake relay station blacklist, wherein after the radio terminal carries out the wireless signal scanning, the processor compares the fake relay station blacklist with the identification information of each signal relay station to identify whether there is the fake relay station among the signal relay stations.

In another aspect, the present disclosure provides a method for detecting and protecting against fake relay stations in a telecommunication network, including the following steps: providing a core network, wherein the core network comprises a threat detection device, which comprises a radio terminal and a processor; the radio terminal being communicated with a plurality of signal relay stations, the threat detection device performing a wireless signal scanning, and in the wireless signal scanning, the processor decoding the information in a scanning result generated by the wireless signal scanning to identify the identification information of the signal relay stations; comparing the identification information of each signal relay station with a white list to identify whether there is a fake relay station among the signal relay stations that does not belong to the white list, wherein the white list contains the identification information of the legitimate relay stations; and the processor sending out an alarming message when the fake relay station is identified.

In another embodiment of the above method, the method for detecting and protecting against fake relay stations in a telecommunication network further includes a detection step; the detection step includes: the radio terminal carrying out the wireless signal scanning one after another, and the processor collecting the identification information corresponding to each signal relay station according to the information in the scanning result.

In another embodiment of the above method, the method for detecting and protecting against fake relay stations in a telecommunication network further includes an evaluation step; the evaluation step includes: the processor analyzing the identification information adapted for judging each signal relay station in the information of the result of the wireless signal scanning by a Generative Adversarial Network or at least one of supervised mode processing and unsupervised mode in a Long short-term memory model, so as to determine the identification information adapted for judging each signal relay station in the white list or a fake relay station blacklist.

The object, technical content, features and effects of the present disclosure will be more easily understood from detailed description of specific embodiments.

DESCRIPTION OF EMBODIMENTS

The drawings in the present disclosure are schematic drawings, which are mainly intended to show the interconnection relationship between the components of each component unit, and the operation or functional scope of each component unit is described according to the following embodiments.

Figure 1:
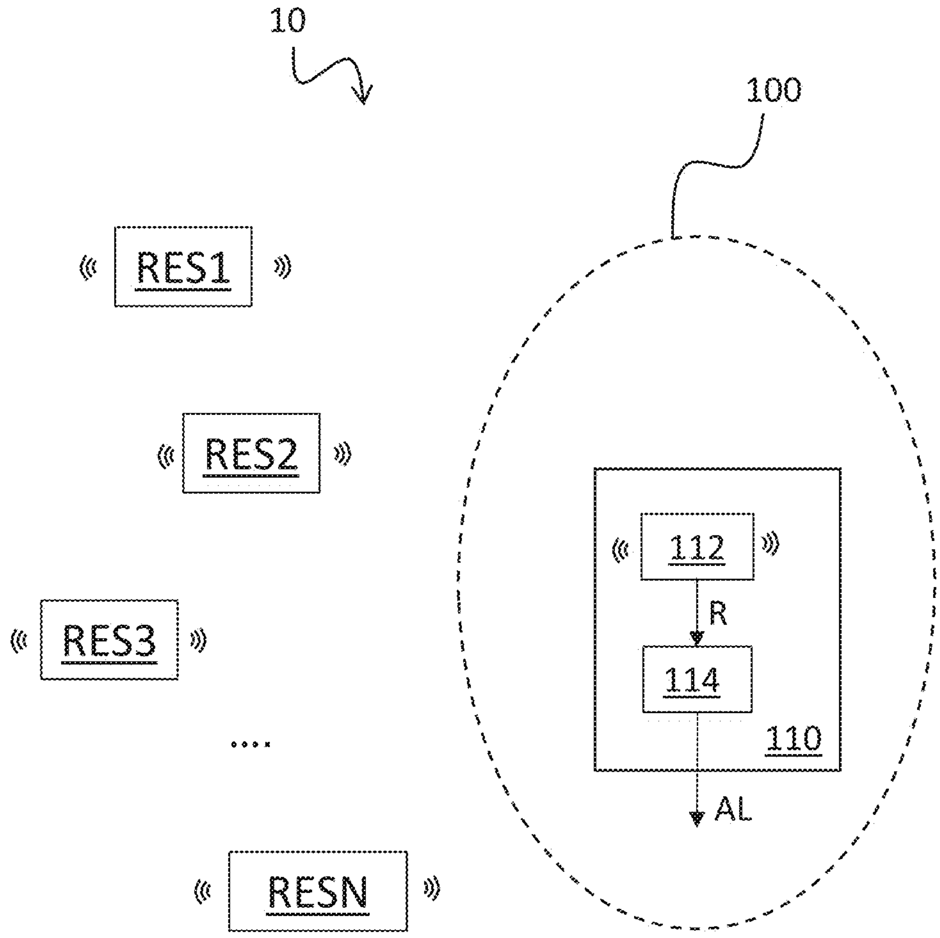
FIG. 1 shows a schematic diagram of a detection and protection system for fake relay stations in a telecommunication network according to an embodiment of the present disclosure.
Figure 2:
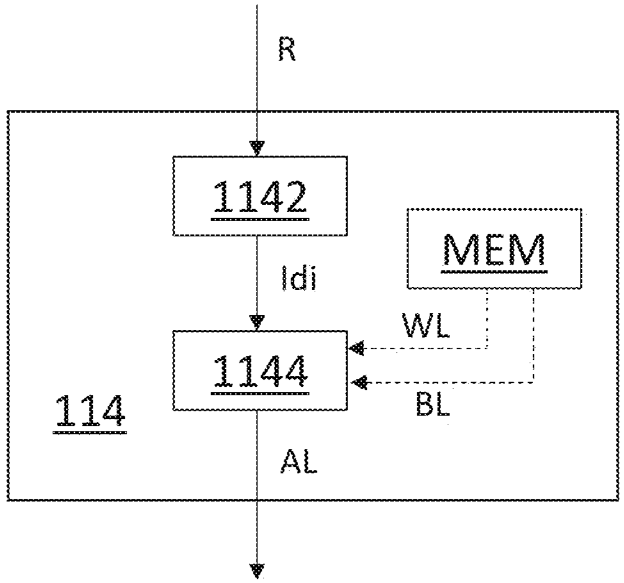
FIG. 2 shows a schematic diagram of a processor according to an embodiment of the present disclosure.

Referring to FIGS. 1 and 2, FIG. 2 shows the processor 114 of the threat detection device 110 in FIG. 1. In an aspect, the present disclosure provides a detection and protection system 10 for fake relay stations in a telecommunication network, which includes a core network 100, which includes a threat detection device 110 including a radio terminal 112 and a processor 114; and a plurality of signal relay stations (RES1, RES2, RES3 . . . . RESN, which are all represented by RES for brevity). The radio terminal 112 is respectively connected to the signal relay station RES, the threat detection device 110 performs a wireless signal scanning. The processor 114 receives a scanning result R of the wireless signal scanning, and identifies each signal relay station RES according to the scanning result R of the wireless signal scanning, and judges whether there is a fake relay station among the signal relay stations RESs. A decoder 1142 in the processor 114 decodes the information in the scanning result R of the wireless signal scanning to generate the identification information Idi of each signal relay station RES, and compares the identification information Idi with a white list WL in a comparison calculation unit 1144 to determine whether the signal relay station RES contains a fake relay station which does not belong to the white list WL, wherein the white list WL contains the identification information Idi of a legitimate relay station, and when the fake relay station is identified, the threat detection device 110 sends out an alarming message AL.

The above-mentioned core network, except for the related technologies and components of the detection and protection of the present disclosure, is a conventional technology, and thus will not be described here.

In an embodiment, the items in the white list WL may include an identification code list of each signal relay station RES and a physical identification method (for example, the Identification information Idi generated by a Physical unclonable function (PUF) generated by an internal component in the signal relay station RES), the signal relay station identification code in a transmission process, the positioning reference identification information, the version and parameter information of the communication protocol, the predetermined connection information of the signal relay station RES (for example, the sensing range of a connected sensor, the working range of a controller to which the signal relay station RES is predetermined to connect), or the historical records of the above information, etc., which will be described in the following embodiments for details. In an embodiment, the above items in the white list WL can be encrypted to avoid being recorded, by which fake relay stations disguise as legitimate relay stations and hide in the telecommunication network in the identification process. In an embodiment, the processor 114 may include computing elements such as a central processing unit (CPU), a digital signal processor (DSP), a microprocessor (MCU), a graphics processor (GPU), and a microcontroller (MCU), depending on requirements. In an embodiment, when a fake relay station is identified, different processing methods can be adopted as needed. For example, when a fake base station connection is confirmed in the mobile network, this alarming message AL can inform the system administrator as well as the police to search for the fake base station to arrest the active criminals.

In an embodiment, when the fake relay station is identified, the threat detection device 110 sends an alarming message AL, and the core network 100 stops communicating the fake relay station. In this way, the malicious behaviors of the fake relay station, for example, intercepting sensitive information, eavesdropping activities, sending phishing messages, stealing victims' data for unauthorized purchase, etc., can be isolated, so as to maintain the security of the telecommunication network.

In an embodiment, the system for detecting and protecting against fake relay stations in the telecommunication network 10 further includes a memory unit MEM, which stores the identification information Idi of each fake relay station in a fake relay station blacklist BL, wherein, after the radio terminal 112 carries out the wireless signal scanning, the processor 114 generates the corresponding identification information Idi, and compares the fake relay station blacklist BL with the identification information Idi of each signal relay station RES to determine whether there are fake relay stations in the signal relay stations RESs. The memory unit MEM can be installed in any component of the detection and protection system 10 for fake relay stations in a telecommunication network, or it can be an independent component. The memory unit MEM in the figure is installed in the processor 114, as an example.

In an embodiment, there are many options for the message transmission mode of the telecommunication network; for example, radio, cable, TV, telephone, data communication or computer network. For example, when the telecommunication network is a mobile communication network, these signal relay stations RESs are base stations and fake relay stations are fake base stations. Or, when the telecommunication network is an Internet of Things, the signal relay stations RESs are the Internet of Things gateways, and the fake relay stations are disguised Internet of Things gateways.

In an embodiment, when the telecommunication network is a mobile communication network, its identification information Idi may include: a System information block (SIB), or a main information block (MIB). The identification information Idi of each base station includes: radio channel code, Physical cell identity (PCI), or tracking area code (TAC), etc., and the user can decide his identification information Idi as needed. For example, in the subsequent embodiments, the form selection of the identification information Idi, especially the form selection of the identification information Idi corresponding to a legitimate relay station or a fake relay station, is generated by a Generative Adversarial Network or a Long short-term memory model.

Figure 3:
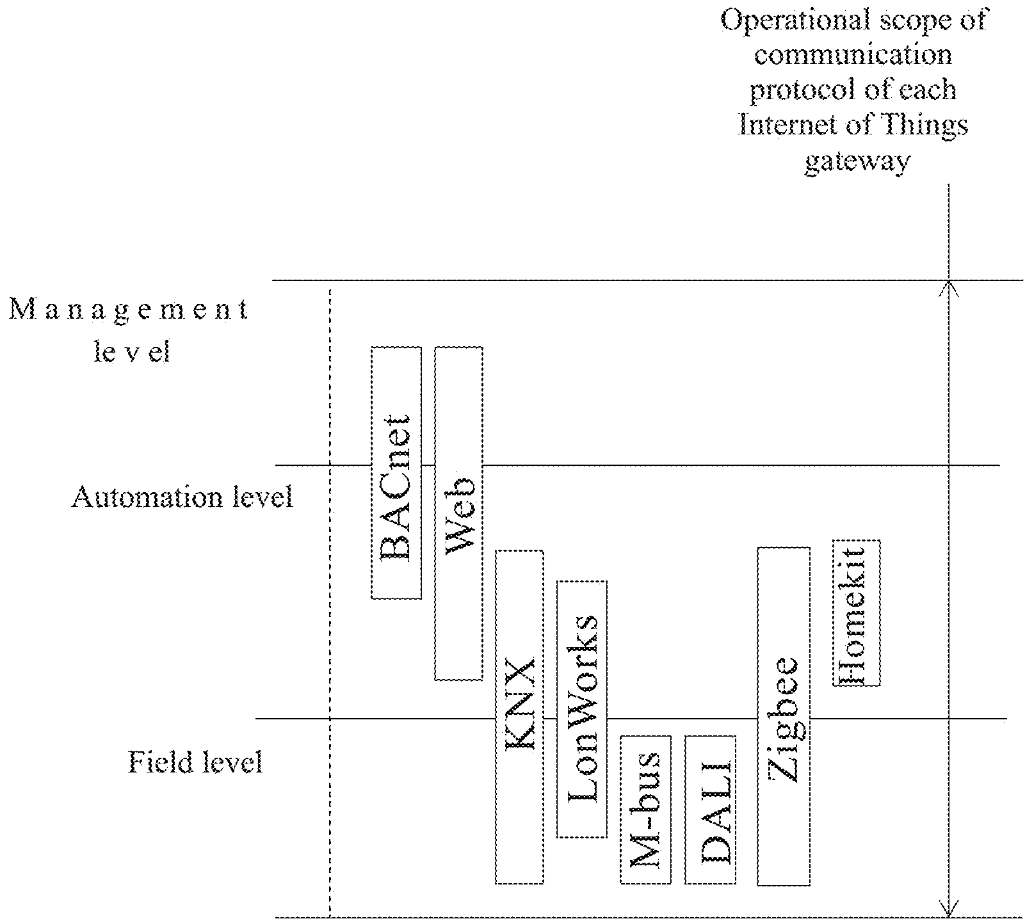
FIG. 3 is a schematic diagram showing the operational range of the communication protocol of the Internet of Things gateway according to an embodiment of the present disclosure.
Figure 4:
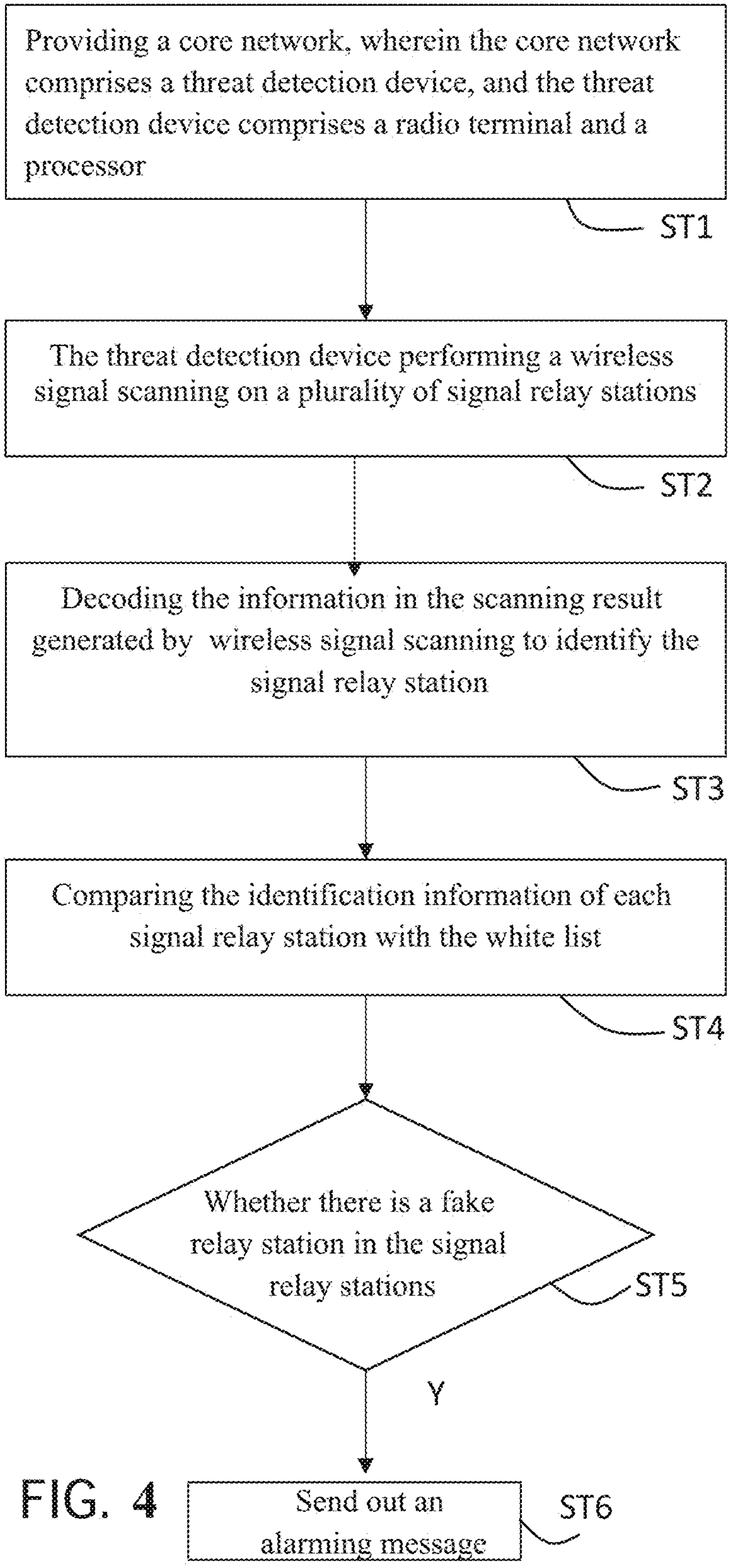
FIG. 4 shows a schematic diagram of a detection and protection system for fake relay stations in a telecommunication network according to an embodiment of the present disclosure.

In an embodiment, when the telecommunication network is the Internet of Things (IoT), the identification information Idi may include: the identification code of each Internet of Things gateway, the parameter value of each Internet of Things gateway, the sensing range of a sensor connected to the Internet of Things gateway, and the operational range of the communication protocol of each Internet of Things gateway (for example, in the Field level, the Automation level and the Management level). The identification information Idi not only includes the above-mentioned signal relay station identification code, positioning reference identification information, or the version of the communication protocol and its parameter information, the predetermined connection information of the signal relay station RES (for example, the sensing range of the connected sensor, the working range of the controller to which the signal relay station RES is predetermined to connect), or the history of the above-mentioned information, but also includes the operable range of the communication protocol in the field layer, the automation layer and the management layer. The different versions and types of the protocol (FIG. 3) will lead to differences in the operational scope among the field layer, automation layer and management layer. For another example, different types of connected sensors will have different operational ranges in each layer. These differences can be used to identify the signal relay stations RESs.

In an embodiment, the identification information Idi of the signal relay station RES is generated based on a physical unclonable function (PUF) of an internal component in the signal relay station RES, wherein the signal relay station RES generates a current identification code according to the physical unclonable function, and generates an identification code tracking record of the current identification code relative to an initial identification code; the signal relay station RES restores the initial identification code to generate identification information Idi according to the identification tracking record and the current identification information. The physical unclonable function is the Intrinsic property of the internal component in the signal relay station RES. However, with the increasing cumulative working hours, the identification code generated by the physical unclonable function may change due to aging and other factors. Therefore, it is necessary to restore the current identification information to the initial identification code by using the identification code tracking record to maintain the stability of the identification information Idi. The initial identification code generated by the physical unclonable function can be used to identify the signal relay station RES.

On the other hand, the present disclosure provides a method for detecting and protecting against fake relay stations in a telecommunication network, which includes: providing a core network 100, wherein the core network 100 includes a threat detection device 110, which includes a radio terminal 112 and a processor 114 (ST1); the radio terminal 112 being communicated with a plurality of signal relay stations RESs, the threat detection device 110 performing a wireless signal scanning (ST2); the processor 114 decoding the information in a scanning result generated by the wireless signal scanning to identify the signal relay stations RESs and to identify the identification information of each signal relay station RES (ST3); comparing the identification information Idi of each signal relay station RES with a white list WL to identify whether there is a fake relay station among the signal relay stations RESs that does not belong to the white list (ST4), wherein the white list WL contains the identification information Idi of a legitimate relay station; and when the fake relay station is identified (ST5), the threat detection device 110 sending out an alarming message AL (ST6).

In an embodiment of the above method, the method for detecting and protecting against fake relay stations in the telecommunication network further includes a detection step, which includes: the radio terminal 112 carrying out the wireless signal scanning one after another, and the processor 114 collecting the identification information Idi corresponding to each signal relay station RES according to the information in the scanning result.

In an embodiment of the above method, the method for detecting and protecting against fake relay stations in the telecommunication network further includes an evaluation step, which includes: the processor 114 analyzing the information in the wireless signal scanning result by a Generative Adversarial Network or at least one of a supervised mode processing and a unsupervised mode in a Long short-term memory model, which is adapted for judging the form of the identification information Idi of each signal relay station RES, so as to determine the identification information Idi in the white list WL or the fake relay station blacklist BL. The supervised mode can process the identification mode of a known white list WL, and the unsupervised mode can be used to analyze a new identification mode of the white list WL in the information in the wireless signal scanning result. As such, users can decide the method they adopt according to their needs.

Figure 5:
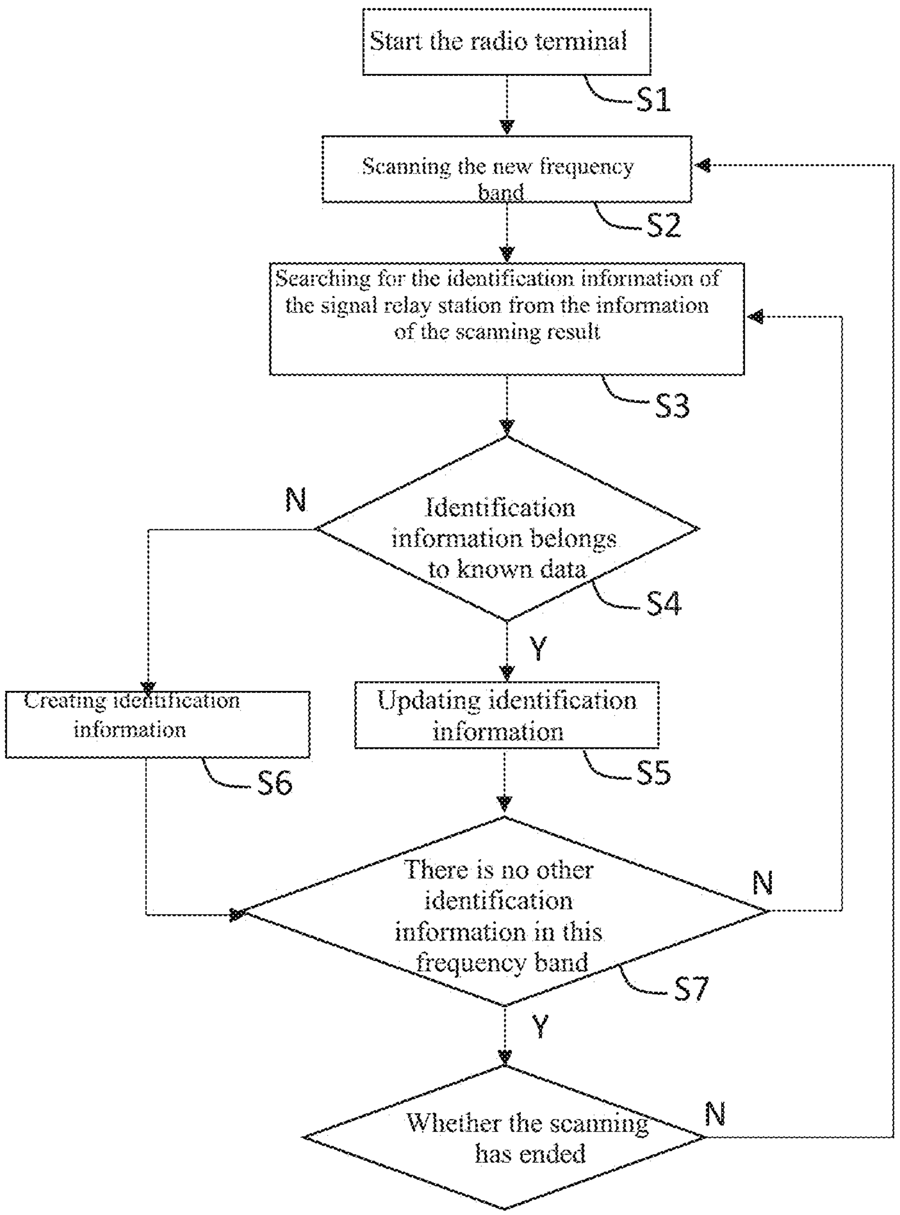
FIG. 5 shows the steps of wireless signal scanning according to an embodiment of the present disclosure.

Referring to FIG. 5, in an embodiment of the present disclosure, the process of wireless signal scanning may include: starting the radio terminal 112 (S1); scanning a new frequency band (S2), and searching for the identification information idi of the signal relay station RES from the information of the scanning result R (S3); Judging whether the identification information Idi belongs to known data (S4) (for example, white list WL, fake relay station blacklist BL, or other databases); updating the identification information Idi if it belongs to the known data (S5), or creating new identification information idi in the known data if it does not belong to the known data (S6); if there is no other identification information Idi in this frequency band (S7), proceeding to scan the next frequency band. In this way, the present disclosure can collect the identification information Idi of each signal relay station RES frequency band by frequency band and step by step.

The present disclosure has been described above with reference to the embodiments, but the above description is only for making the people familiar with the technology easily understand the contents of the disclosure, and is not used to limit the scope of the rights of the disclosure. Various equivalent changes can be contemplated by those skilled in the art within the same spirit of the present disclosure. For example, the signal connections between components and units that are not specified in detail can be wired or wireless. The scope of the disclosure should cover different embodiments or all other combinations of equivalent variations.

DESCRIPTION OF REFERENCE SIGNS

10. Detection and protection system for fake relay stations in a telecommunication network
100: Core network
110: Threat detection device
112: Radio terminal
114: Processor
1142: Decoder
1144: Comparison calculation unit
AL: Alarming message
BL: Blacklist of fake relay stations
Idi: Identification information
MEM: Memory unit
R: Scanning result
RES1, RES2, RES3, RESN, RES: Signal relay stations.
S1, S2, S3, S4, S5, S6, S7: Step
ST1, ST2, ST3, ST4, ST5, ST6: Steps
WL: White list.

What is claimed is:

1. A detection and protection system for fake relay stations in a telecommunication network, comprising:

a core network comprising a threat detection device, which comprises a radio terminal and a processor; and a plurality of signal relay stations, wherein the radio terminal is communicated with the signal relay stations, the threat detection device performs a wireless signal scanning, and the processor identifies the signal relay stations according to a result of the wireless signal scanning and judges whether there are fake relay stations among the signal relay stations;

wherein, the processor decodes the information in the result of the wireless signal scanning, compares the identification information of each signal relay station in the information with a white list, so as to identify whether the signal relay stations include fake relay stations which do not belong to the white list, wherein the white list contains the identification information of legitimate relay stations;

wherein the identification information of each of the signal relay stations is generated based on a physical unclonable function (PUF) of an internal component of said each signal relay station, wherein said each signal relay station generates a current identification code according to the physical unclonable function, generates an identification code tracking record of the current identification code relative to an initial identification code, and restores an initial identification code according to the identification code tracking record and the current identification code; and wherein in case that the fake relay stations are identified, the processor sends out an alarming message.

2. The detection and protection system for fake relay stations in a telecommunication network according to claim 1, wherein in a case that the telecommunication network is a mobile communication network, the signal relay stations are base stations and the fake relay stations are fake base stations; or when the telecommunication network is an Internet of Things, the signal relay stations are Internet of Things gateways and the fake relay stations are fake Internet of Things gateways.

3. The detection and protection system for fake relay stations in a telecommunication network according to claim 2, wherein the telecommunication network is the mobile communication network, and the identification information comprises: a System information block (SIB), or a main information block (MIB).

4. The detection and protection system for fake relay stations in a telecommunication network according to claim 2, wherein the telecommunication network is the Internet of Things (IoT), and the identification information comprises: an identification code of each Internet of Things gateway, a parameter value of each Internet of Things gateway, a sensing range of a sensor connected to the Internet of Things gateway, and an operable range of a communication protocol of each Internet of Things gateway at a Field level, an Automation level and a Management level.

5. The detection and protection system for fake relay stations in a telecommunication network according to claim 1, wherein when the fake relay station is identified, the threat detection device sends out the alarming message to stop the core network signal from connecting with the fake relay station.

6. The detection and protection system for fake relay stations in a telecommunication network according to claim 1, further comprising a memory unit for storing the identification information of each fake relay station in a fake relay station blacklist, wherein after the radio terminal carries out the wireless signal scanning, the processor compares the fake relay station blacklist with the identification information of each signal relay station to identify whether there is the fake relay station among the signal relay stations.

7. A method for detecting and protecting against fake relay stations in a telecommunication network, comprising the following steps:

providing a core network, wherein the core network comprises a threat detection device, which comprises a radio terminal and a processor;

the radio terminal being communicated with a plurality of signal relay stations, the threat detection device performing a wireless signal scanning, and in the wireless signal scanning, the processor decoding the information in a scanning result generated by the wireless signal scanning to identify the identification information of the signal relay stations;

comparing the identification information of each signal relay station with a white list to identify whether there is a fake relay station among the signal relay stations that does not belong to the white list, wherein the white list contains the identification information of legitimate relay stations; and the processor sending out an alarming message when the fake relay station is identified, wherein the method further comprises a detection step and an evaluation step, wherein in the detection step, the radio terminal carries out the wireless signal scanning one after another, and the processor collects the identification information corresponding to each signal relay station according to the information in the scanning result generated by the wireless signal scanning, and in the evaluation step, the processor analyzes the identification information for judging each signal relay station according to the scanning result of the wireless signal scanning by a Generative Adversarial Network or at least one of a supervised mode and an unsupervised mode in a Long Short-Term Memory model, so as to determine the identification information for judging each signal relay station in the white list or a fake relay station blacklist.

8. The method for detecting and protecting against fake relay stations in a telecommunication network according to claim 7, wherein in a case that the telecommunication network is a mobile communication network, the signal relay stations are base stations and the fake relay stations are fake base stations; or in a case that the telecommunication network is the Internet of Things, the signal relay stations are Internet of Things gateways and the fake relay stations are fake Internet of Things gateways; and, the telecommunication network is the mobile communication network, and the identification information comprises: a System information block (SIB), or a Master information block (MIB); in addition, the telecommunication network is the Internet of Things (Internet of Things; IoT), the identification information comprises: an identification code of each Internet of Things gateway, a parameter value of each Internet of Things gateway, a sensing range of a sensor connected to the Internet of Things gateway or a working range of a controller, and an operable range of a communication protocol of each Internet of Things gateway at a Field level, an Automation level and a Management level.

* * * * *